US005573733A

United States Patent [19]

Salama

[11] Patent Number: 5,573,733
[45] Date of Patent: Nov. 12, 1996

[54] INNER ELECTRODE FOR AN OZONE GENERATOR, OZONE GENERATOR CONTAINING SAID ELECTRODE AND METHOD OF USE OF SAID OZONE GENERATOR

[75] Inventor: Amir Salama, Granby, Canada

[73] Assignee: Poptec Ltee, Quebec, Canada

[21] Appl. No.: 987,200

[22] Filed: Dec. 7, 1992

[30] Foreign Application Priority Data

Nov. 8, 1992 [CA] Canada ................................. 2075789

[51] Int. Cl.⁶ .................................................. B01J 19/08
[52] U.S. Cl. ................................ 422/186.18; 422/180.19; 422/907; 204/176
[58] Field of Search ........................ 422/186.07, 186.18, 422/186.11, 186.19, 907; 204/176

[56] References Cited

U.S. PATENT DOCUMENTS

| | | | |
|---|---|---|---|
| 512,265 | 1/1894 | Andreoli | 422/186.07 |
| 574,341 | 12/1896 | Pridham | 422/186.07 |
| 640,694 | 1/1900 | Otto | 422/186.07 |
| 788,557 | 5/1905 | Sahlstrom | 422/186.07 |
| 832,767 | 10/1906 | Bridge | 422/186.07 |
| 935,457 | 9/1909 | Bridge | 422/186.07 |
| 995,958 | 6/1911 | Goldberg | 422/186.07 |
| 1,010,777 | 12/1911 | Leggett | 422/186.07 |
| 1,326,631 | 12/1919 | Bayeux | 422/186.07 |
| 1,588,976 | 6/1926 | McBlain | 422/186.07 |
| 1,834,705 | 2/1930 | Hartman | 422/186.07 |
| 2,093,619 | 9/1937 | Powell | 204/32 |
| 3,798,457 | 3/1974 | Lowther | 250/532 |
| 3,919,064 | 11/1975 | Lowther | 204/176 |
| 3,984,697 | 9/1976 | Lowther | 250/532 |
| 3,996,122 | 4/1976 | Lowther | 204/176 |
| 4,213,838 | 5/1980 | Lowther | 204/176 |
| 4,504,446 | 6/1985 | Kunicki et al. | 422/186.19 |
| 4,614,573 | 9/1986 | Masuda | 204/176 |
| 4,764,349 | 11/1988 | Arff et al. | 422/186.18 |
| 4,774,062 | 9/1988 | Heinemann | 422/186.19 |
| 4,859,429 | 8/1989 | Nisenson | 422/186.13 |
| 4,877,588 | 10/1989 | Ditzler et al. | 422/186.19 |
| 4,909,996 | 6/1990 | Uys | 422/186.07 |
| 4,960,570 | 8/1990 | Mechtersheimer | 422/186.21 |
| 4,966,666 | 10/1990 | Waltonen | 204/164 |
| 4,986,968 | 1/1991 | Hirth et al. | 422/186.19 |
| 5,002,738 | 3/1991 | Pin et al. | 422/186.13 |
| 5,002,739 | 3/1991 | Ditzler et al. | 422/186.19 |
| 5,008,087 | 4/1991 | Batchelor | 422/186.22 |
| 5,041,145 | 8/1991 | Kakinuma et al. | 55/122 |
| 5,052,382 | 11/1991 | Wainwright | 128/202.25 |
| 5,147,614 | 9/1992 | Conrad | 422/186.18 |

Primary Examiner—Ngoclan Mai
Assistant Examiner—Daniel Jenkins
Attorney, Agent, or Firm—Merchant, Gould, Smith, Edell, Welter & Schmidt

[57] ABSTRACT

The invention relates to an electrode for an ozone generator of the type comprising an outer electrode having an inner surface made of dielectric material and an outer surface comprising an electric conducting material; an inner electrode having an outer surface, said inner electrode being concentrically positioned inside the outer electrode; a gap positioned between said inner and outer surfaces; means for circulating an oxygen containing gas through said gap; means for applying a potential difference between said inner and outer surfaces; means for cooling the inner electrode; and means for cooling the outer electrode; wherein said inner electrode comprises: a massive member of heat and electric conducting material whose at least a portion of the outer surface is provided a plurality of protrusions defining a plurality of points; at least one inner duct having opposite opened ends, provided in the massive member and defining an inner surface to said inner electrode, said inner duct being intended to allow a flow of cooling gas to circulate therethrough and contact said inner surface; said electrode having such a mass and outer surface that it can work as a heat sink to collect heat generated at its outer surface and bring it at a regulated heat flow to its inner surface where it can be collected by the cooling gas. The invention also relates to an ozone generator comprising such an inner electrode and to a method of use of said ozone generator.

34 Claims, 11 Drawing Sheets

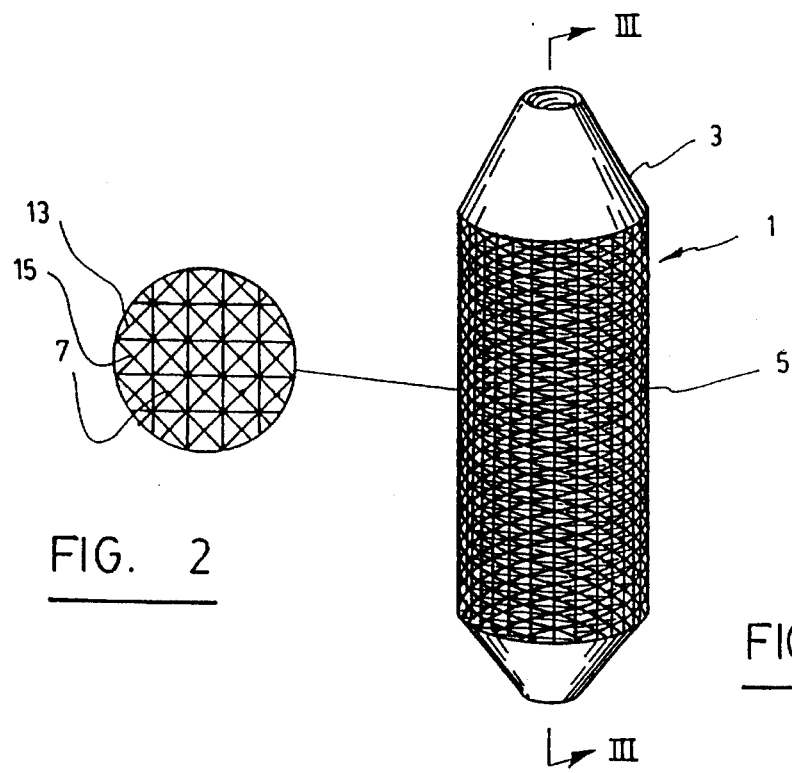
FIG. 2
FIG. 1
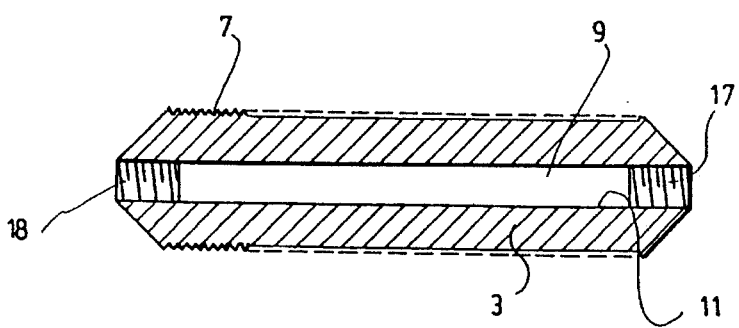
FIG. 3
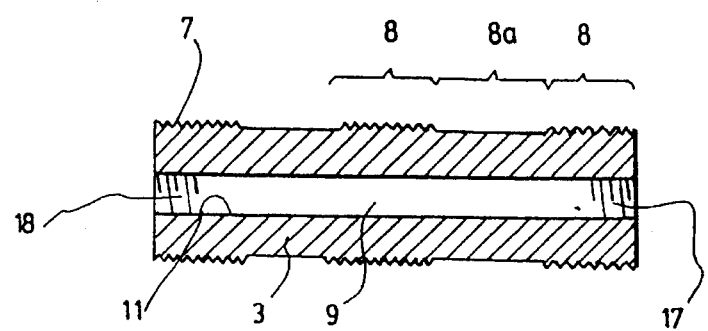
FIG. 3a

INNER ELECTRODE FOR AN OZONE GENERATOR, OZONE GENERATOR CONTAINING SAID ELECTRODE AND METHOD OF USE OF SAID OZONE GENERATOR

BACKGROUND OF THE INVENTION

1. Field of the Invention

This invention relates to a new inner electrode for an ozone generator working according to well known "corona effect". The invention also relates to an ozone generator containing said new inner electrode and to a method of use of said ozone generator.

2. Description of the Prior Art

U.S. Pat. No. 3,798,457 relates to a corona reactor core including a plurality of adjacent, individual, spaced-apart air-tight corona reactor cells. Each cell includes a pair of spaced-apart electrodes defining a corona discharge chamber between interior facing surfaces thereof, both of said interior having a uniform 40 mils coating of dielectric material thereon. Also, each of said electrodes has an exterior heat exchange surface exposed to a fluid coolant passageway, optionally a heat sink, and means for feeding a fluid into and out of each of said chambers.

U.S. Pat. No. 3,984,697 relates to an improvement in a corona generator including a pair of spaced apart, adjacent electrodes defining a corona discharge chamber between facing interior surfaces of said electrodes. According to this improvement, at least one of said electrodes has a metal electrode substrate having a thin, hard, fired-on coating of porcelain enamel having a thickness of less than 20 mils and bonded onto said surface of said electrode. Preferably, according to this patent, each of said coating has a flat, smooth surface.

U.S. Pat. No. 4,504,446 relates to a gas-cooled ozone generator having paired tubular concentric electrodes and a solid dielectric disposed therebetween, characterized in that the outer electrode is provided with cooling flanges and spaced from the dielectric such that an annular gap is formed, that the axial ends of said gap are sealed by annular spacers, that the dielectric and the inner electrode have open ends to allow throughflow of cooling gas, and that cooling of the dielectric and of the inner electrode is effected by means of at least one expandable body which is disposed inside the inner electrode, against which the body abuts, and which is open to throughflow of cooling gas, said body comprising a sheet formed into a cylinder with two inwardly directed flanges.

U.S. Pat. No. 4,877,588 relates to an apparatus for generating ozone from an oxygen containing gas:

an inner cylinder of thermally conductive dielectric material surrounded by an intermediate cylinder of thermally and electrically conductive material to define a first annular space, said intermediate cylinder being surrounded by an external cylinder to define a second annular space;

a passage at one end of said inner cylinder communicating the interior thereof with said first annular space, whereby gas emerging from said inner cylinder is directed into said first annular space to flow therethrough counter-current to said gas in said inner cylinder;

a plurality of conductive bands along the interior surface of said dielectric cylinder to define corona discharge regions in said first annular space, said conductive bands spaced apart axially to define corona-free regions therebetween of sufficient axial dimension to permit removal of heat generated in said corona discharge regions by heat exchange through said inner cylinder and said through said intermediate cylinder; and means for supplying current to said conductive bands.

U.S. Pat. No. 4,960,570 relates to an ozone generator with a first and a second metallic electrodes, with a layer of enamel on the surface of the second electrode facing the first electrode and a discharge gap between the first electrode and the enamel layer, wherein the enamel layer consists of a plurality of layers of different dielectric constants lying one on top of the other, the first layer adjacent to the discharge gap having a smaller dielectric constant than the second enamel layer(s) lying underneath.

All aforesaid ozone generator are either sophisticated and thus expensive to manufacture and/or require special enamel coating which complicates manufacturing process and thermal management is done in an intricate way.

It is well known in the art that ozone concentration C is directly proportional to electric power W per unit area and K a constant function of electrode characteristics and configuration:

$$C = K(\text{constant}) \cdot W$$

Also, it is well known in the art that the electric power consumption W is related to breakdown voltage Vb and capacitances of air Ca and tube media Ct as well as voltage applied V and frequency F:

$$W = 4F \cdot Ct \cdot Vb(V - (Ca/Ca + Ct) \cdot Vb)$$

Up to now, prior art ozone generator exploited variables such as dielectric values, frequency and voltage to optimize the electric power consumption.

Therefore, there is a need for an ozone generator that is at once simple, efficient, inexpensive to manufacture and which may further allow to reduce the breakdown voltage of the air or oxygen, minimize the power consumption and minimize heat generation to thus maximize the ozone production. In other words, to optimize and maximize the constant K.

SUMMARY OF THE INVENTION

A first object of the invention is a new electrode allowing to built an ozone generator that is simple, efficient and inexpensive to manufacture. Advantageously, this electrode may show an efficient cooling in order to contribute to a high ozone production.

More particularly, this new electrode allows to obtain an ozone generator maximizing the ozone production while minimizing the electrical power consumption. Preferably, this new electrode further allow to obtain an ozone generator in which breakdown voltage of air or oxygen containing gas is reduced, power consumption and heat generation are minimized and ozone production is maximized.

Another object of the invention is a new electrode which is massive and provided with at least one inner duct through which a cooling gas is to be circulated in order to regulate (i.e. to cool and keep cool) the temperature of said electrode. Preferably, the cooling gas is either circulated through the inner duct(s) by a chimney effect and/or vacuum, or circulated under pressure through said(s) inner duct(s).

Another object of the invention is a new electrode which is massive and provided with at least one inner duct, said duct being provided with means allowing to suddenly expand a pressurized cooling gas therein to thus take advantage of the well known Joule-Thompson effect and further cool and keep cool the inner electrode.

Another object of the invention is a new electrode which is provided with an outer surface having a plurality of protrusions each having a tip contributing to lower the breakdown voltage that is necessary for the ionisation of the oxygen containing gas (such as air) and thus allow the use of greater gaps between the electrodes to create a larger, denser and more uniform corona where more atoms are ionised and more ozone is generated. Indeed, electrons seek the tip of the protrusions and jump the gap between the electrodes to therefore start the ionisation of the air or oxygen containing gas. Advantageously, after the beginning of the ionisation, most of the electrical energy shall go to ozone production rather than heat. For example, such an inner electrode with protrusions may be 25% cooler than a similar inner electrode having a smooth outer surface for a given power consumption W. Preferably, with an electrode provided with such protrusions, gaps of 3 to 5 mm can be used with voltage as low than 10 KV, while other similar configurations are generally limited to 0.5 to 1.5 mm.

Another object of the invention is a new electrode which is provided with an outer surface having a plurality of protrusions to uniformly disperse, mix and thereby force all the air or oxygen containing gas along the whole surface of said electrode and dielectric, to thus further increase the ozone production. Optionally, the surface of the inner electrode may be provided, as function of the voltage input, with alternating areas of different protrusion configurations and/ or smooth surface to allow for denser corona zones, appropriate cooling zones Indeed, an increase of surface allows more heat to be collected and brought to the cooling gas. Also, the flow of oxygen containing gas may be subjected to pulsations, detonations,shock waves, preferably pulsations, in order to further improve the ozone production. For example, with pulsations, ozone production may be increased of about 25%.

Preferably, an inner electrode having aforesaid characteristics, (i.e. protrusions, axial air cooling and heat sink effects) may yield 10 to 30 times more ozone per unit of length than ozone generators having open structure electrodes (brushes). Also, the temperature of this inner electrode preferably never exceeds 35° C. in order to assures that all ozone generated will not breakdown to oxygen since a reversible reaction starts around 40° C. (i.e. where ozone is converted back to oxygen).

More particularly, the invention relates to an inner electrode intended to be used in an ozone generator having at least one reactor cell of the type comprising an outer electrode having an inner surface made of dielectric material and an outer surface comprising an electric conducting material; an inner electrode having an outer surface, said inner electrode being concentrically positioned inside the outer electrode; a gap positioned between said inner and outer surfaces; means for circulating an oxygen containing gas through said gap; means for applying a potential difference between said inner and outer surfaces; means for cooling the inner electrode; and means for cooling the outer electrode; wherein said inner electrode comprises:

a massive member of heat and electric conducting material whose at least a portion of the outer surface is provided with a plurality of protrusions defining a plurality of points;

at least one inner duct having opposite ends, provided in the massive member and defining an inner surface to said inner electrode, said inner duct being intended to allow a flow of cooling gas to circulate therethrough and contact said inner surface;

said electrode having such a mass and outer surface that it can work as a heat sink to collect heat generated at its outer surface and bring it at a regulated heat flow to its inner surface where it can be collected by the cooling gas.

Another object of the invention is an ozone generator having at least one reactor cell comprising the aforesaid inner electrode.

More particularly, the invention relates to an improvement in an ozone generator having at least one reactor cell of the type comprising:

an outer electrode made of dielectric material, said dielectric material having an inner surface and having an outer surface comprising an electric conducting material;

an inner electrode having an outer surface, said inner electrode being concentrically positioned inside the outer electrode;

a gap positioned between said inner and outer surfaces;

means for circulating an oxygen containing gas through said gap;

means for applying a potential difference between said inner and outer surfaces;

means for cooling the inner electrode; and means for cooling the outer electrode;

the improvement wherein said inner electrode comprises:

a massive member of heat and electric conducting material whose at least a portion of the outer surface is provided with a plurality of protrusions defining a plurality of points;

at least one inner duct having opposite ends, provided in the massive member and defining an inner surface to said inner electrode, said inner duct being intended to allow a flow of cooling gas to circulate therethrough and contact said inner surface; and means for circulating the cooling gas through said inner duct;

said electrode having such a mass and outer surface that it can work as a heat sink to collect heat generated at its outer surface and bring it at a regulated heat flow to its inner surface where it can be collected by the cooling gas.

Another object of the invention is a method of use of the aforesaid ozone generator.

More particularly, the invention relates to a method for generating ozone, wherein a flow of oxygen containing gas (such as air) is circulated in the gap of a reactor cell of an ozone generator according to the invention and as defined hereinbefore, from an inlet to an outlet while a potential difference (for example as low than 10 KV and preferably of about 25 KV) is applied between the inner and outer surface of said electrodes so as electric arcs may pass from the inner surface of the dielectric to the tips of protrusions of the inner electrode through the oxygen containing gas to thus generate an ozone containing gas enriched at the outlet of the reactor cell.

BRIEF DESCRIPTION OF THE DRAWINGS

The present invention will be better understood with reference to the following non-restrictive description of preferred embodiments thereof, make in connection with the following drawings wherein:

FIG. 2 is an enlarge view of a part of the outer surface of the electrode of FIG. 1.

FIG. 3 is a cross-sectional view according to III—III of the electrode of FIG. 1;

FIG. 3a is a cross-sectional view of a variant of the electrode of FIG. 3;

FIG. 4a is a partial cross-sectional view of a variant of the sleeve 36 of the reaction cell of FIG. 4;

FIG. 13 is a perspective view of a longitudinal cross section of the reactor cell of an ozone generator of FIG. 12 with the inner electrode of FIG. 3a.

DESCRIPTION OF PREFERRED EMBODIMENTS

Figure 1A:
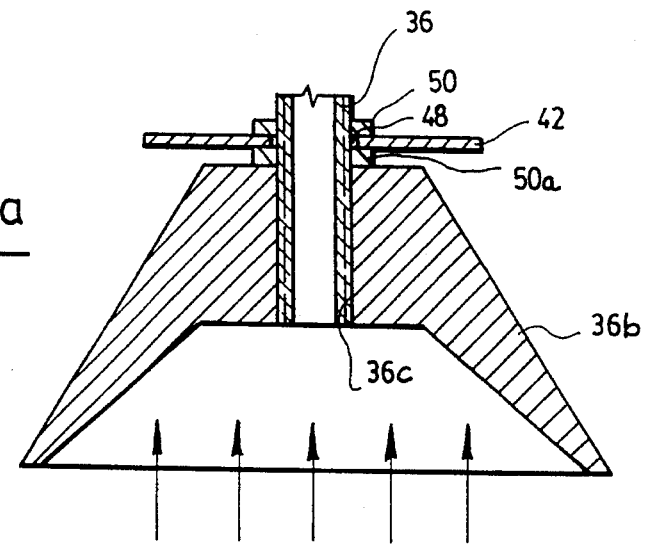
FIG. 1 is a perspective view of a new inner electrode according to the invention.

Referring to FIGS. 1 to 3, there is represented a preferred inner electrode 1 for an ozone generator of the type provided with at least one reactor cell comprising an outer electrode having an inner surface made of dielectric material and outer surface comprising an electric conducting material; an inner electrode having an outer surface, said inner electrode being concentrically positioned inside the outer electrode, a gap positioned between said inner and outer surfaces; means for circulating an oxygen containing gas through said gap; means for applying a potential difference between said inner and outer surfaces; means for cooling the inner electrode; and means for cooling the outer electrode.

This inner electrode 1 comprises:

a massive member 3 of heat and electric conducting material whose a portion of the outer surface 5 defines a cylindrical surface provided with a plurality of protrusions 7 defining a plurality of points;

an inner duct 9 provided in the massive member 3 and defining an inner surface 11 to said inner electrode, said inner duct 9 being intended to allow a flow of cooling gas to contact the inner surface 11;

said electrode having such a mass that it can work as a heat sink to collect heat generated at its outer surface and bring it at a regulated heat flow of its inner surface where it can be collected by the cooling gas.

Advantageously, the inner electrode 1 is a massive cylinder of electric and heat conductive material selected from the group consisting of graphite, steel, stainless steel, brass, copper, tungsten, molybdenum, aluminum and alloys thereof, and having an apparent density of 0.5 to 0.9 of the material used (i.e. with reference to a similar cylinder which is not provided with an inner duct 9). Preferably, the ratio between the outer and the inner surfaces, without considering the increase of surface generated by the presence of protrusions, may vary from 2 to 5.

Advantageously, protrusions 7 which are provided on the outer surface 5 of the inner electrode 1, are obtained either by chemical etching of said surface 5, electroforming of said surface 5 or by machining of said surface 5.

Preferably, as illustrated in FIGS. 1 and 2, protrusions 7 are obtained by machining said surface 5 with two sets of parallel grooves 13,15 having a low depth and a "V" shaped cross section, each groove 13 of one set crossing several grooves 15 of another set. Therefore, the resulting protrusions are pyramid, especially square based pyramid and the tip of each pyramid defines a point.

Preferably, the outer surface 5 of the inner electrode 1 and thus protrusions 7 may be further coated, by any appropriated means well known in the art such as electroplating, with a metal or an alloy thereof that will be not affected by ozone or a corona effect. Such a metal or alloy thereof may be advantageously selected from the group consisting of gold, platinum, palladium, iridium, silver, nickel, copper, rhodium and alloys thereof and preferably gold, platinum and palladium. The thickness of the metal or alloy coating may vary from 10 microns to 100 microns.

Advantageously, the outer surface 5 of the inner electrode 1 may be provided with from 9 to 1,000 points per square centimeter and, preferably, the depth of each groove may vary from 0.01 to 3 mm.

Optionally, as illustrated in FIG. 3a, the outer surface 5 may be provided with zones 8 of protrusions spaced apart from each other by smooth zones 8a.

Figure 4:
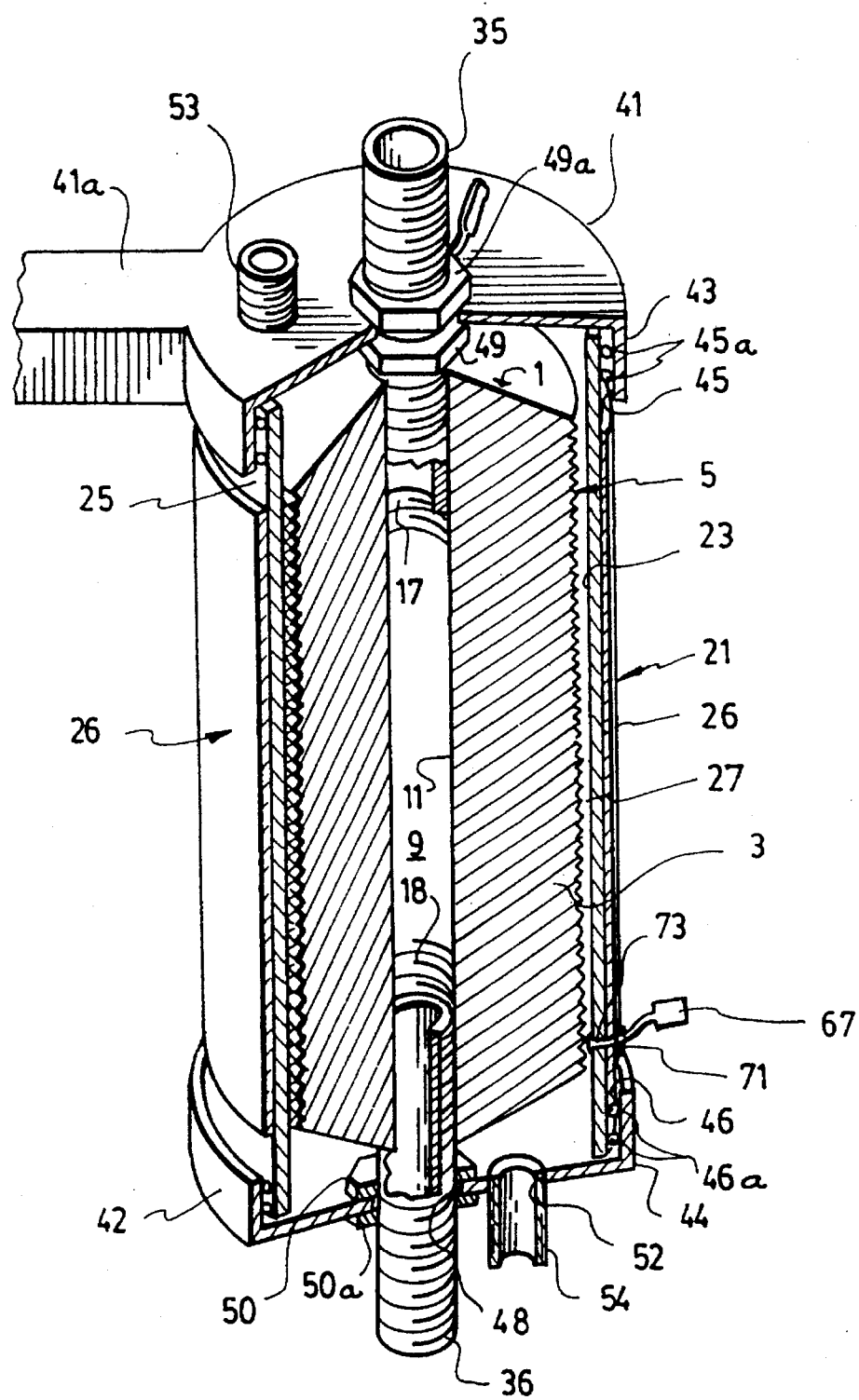
FIG. 4 is a perspective view of a longitudinal cross section of the reactor cell of an ozone generator containing the electrode of FIG. 1.

Referring to FIG. 4, there is represented a reactor cell 2 intended to be used with an ozone generator of the type having at least one reactor cell, said reactor cell 2 comprising:

an outer electrode 21 made of dielectric material having an inner surface 23 and having an outer surface 25 comprising an electric conducting material that may consist of metal electroplated on the outer surface, incorporated in the dielectric material on sputtered in or on the dielectric material, and preferably a foil of copper or brass 26 that may be fastened by any appropriated means on the outer surface of the dielectric material;

an inner electrode 1 having an outer surface 5, said inner electrode 1 being concentrically positioned inside the outer electrode 21;

a gap 27 positioned between said inner and outer surfaces 23 and 5;

means for circulating an oxygen containing gas through said gap 27;

means for applying a potential difference between said inner and outer surfaces 23 and 5; and means for cooling the outer electrode (e.g. radiation and/or convection).

The improvement in this reactor cell 2 consists of an inner electrode 1 comprising:

a massive member 3 of heat and electric conducting material whose a portion of the outer surface 5 defines a cylindrical surface provided with a plurality of protrusions 7 defining a plurality of points;

an inner duct 9 provided in the massive member 3 and defining an inner surface 11 to said inner electrode 1, said surface 11 being co-axial with the cylindrical surface 5, said inner duct 9 being intended to allow a flow of cooling gas to contact said surface 11;

means for circulating a flow of cooling gas through the inner duct 9;

said electrode 1 having such a mass and outer surface that it can work as a heat sink to collect heat generated at its outer surface and bring it at a regulated heat flow to its inner surface 11 where it can be collected by the cooling gas.

Figure 6:
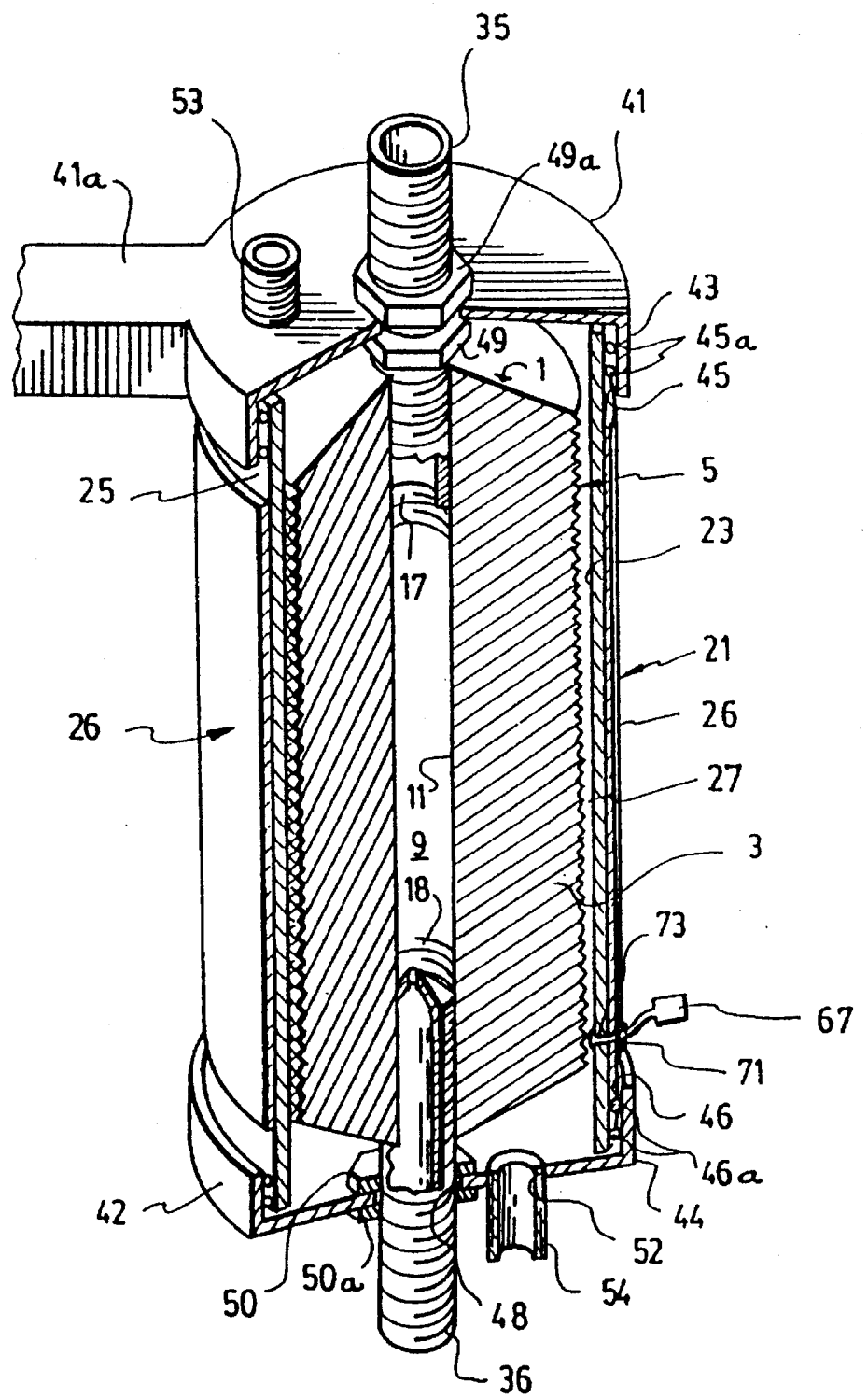
FIG. 6 is a perspective view of a longitudinal cross section of a variant of reactor cell of an ozone generator containing the electrode of FIG. 1.

Of course, even though in FIGS. 4 and 6, only one inner duct is represented, it could be possible to replace it by several parallel inner ducts of smaller diameter. For example, each inner duct may be obtained by mere drilling of the inner electrode 1.

Advantageously, the inner electrode 1 is a massive cylinder of electric and heat conductive material selected from the group consisting of graphite, steel, stainless steel, brass, copper, tungsten, molybdenum, aluminum and alloys thereof, and having an apparent density of 0.5 to 0.9 of the material used (i.e. with reference to a similar cylinder which is not provided with an inner duct 9). Preferably, the ratio between the outer and the inner surfaces, without considering the increase of surface generated by the presence of protrusions, may vary from 2 to 5.

Advantageously, protrusions 7 which are provided on the outer surface 5 of the inner electrode 1, may be obtained either by chemical etching or electroplating (i.e. electroforming) of said surface 5 or by machining of said surface 5 to provide therein at least two sets of parallel grooves 13,15.

Preferably, as illustrated in FIGS. 1 and 2, protrusions 7 are obtained by machining said surface 5 with two sets of parallel grooves 13,15 having a low depth and a "V" shaped cross section, each groove 13 of one set crossing several grooves 15 of another set. Therefore, the resulting protrusions are pyramid, especially square based pyramid and the tip of each pyramid defines a point.

Preferably, the outer surface 5 of the inner electrode 1 and its protrusions 7 may be further coated, by any appropriated means well known in the art such as electroplating, with a metal or an alloy thereof that will be not affected by ozone or a corona effect. Such a metal or alloy thereof may be advantageously selected from the group consisting of gold, platinum, palladium, iridium, silver, nickel, copper, rhodium and alloys thereof and preferably gold, platinum and palladium. The thickness of the metal or alloy coating may vary from 10 microns to 100 microns.

Advantageously, the outer surface 5 of the inner electrode may be provided with from 9 to 1,000 points per square centimeter and, preferably, the depth of each groove may vary from 0.01 to 3 mm.

More particularly, as illustrated in FIGS. 3 and 4, the inner surface 11 of each end of the inner duct 9 may be threaded, and sleeves 35,36 each having a threaded outer surface may be respectively fastened with a corresponding threaded surface of the inner duct 9. To do so a portion of the threaded surface of the sleeve 35 is engaged with a portion of the threaded surface 17 of the inner surface 11 while the threaded surface of the sleeve 36 is engaged with a portion of the threaded surface 18 of the inner surface 11. The inner electrode 1 defines, advantageously, a structural member on which other components of the reactor cell 2 are preferably mounted. Sleeves 35,36 are preferably made of an heat and electric compatible conducting material and more particularly of the same metal or alloy than the one used for the inner electrode 1. These sleeves 35,36 together with covers 41,42, allow a perfect alignment of the outer surface 5 of the inner electrode 2 with respect to the inner surface 23 of the outer electrode 21, to thus control the size of the gap 27.

Optionally, referring to the variant of FIG. 4a, a conical collector 36b may be mounted on the sleeve 36. This collector 36b has a threaded opening 36c and may be screwed on the sleeve 36. When a fan is positioned underneath, it may contribute to force a flow of air through the inner duct 9 to further improve the cooling of the inner electrode 1.

The outer electrode 21 may consist of a cylinder of glass, ceramic or composite, preferably glass, whose the outer surface is provided with a thin foil 26 made of brass or copper. This foil 26 may be glued, brazed, soldered, electroplated, incorporated or sputtered according to techniques well known in the art, on the outer surface of the electrode 21.

Optionally, the foil 26 may be provided with fins, projections or ondulations in order to increase the surface area and thereby further improve the air cooling efficiency of the outer electrode 21.

Each ends of the reactor cell 2 are provided with covers 41 and 42. The cover 41 is provided with a skirt 43 having an inner cylindrical surface 45 and a central bore 47, and is fastened on the sleeve 35 between a pair of nuts 49, 49a engaged on the threaded surface of the sleeve 35. This cover 41 is further provided with a threaded bore 51 in which is engaged a sleeve 53 having a threaded outer surface. The cover 42 is provided with a skirt 44 having an inner cylindrical surface 46 and a central bore 48, and is fastened on the sleeve 36 between a pair of nuts 50, 50a engaged on the threaded surface of the sleeve 36. This cover 42 is further provided with a threaded bore 52 in which is engaged a sleeve 54 having a threaded outer surface.

Figure 7:
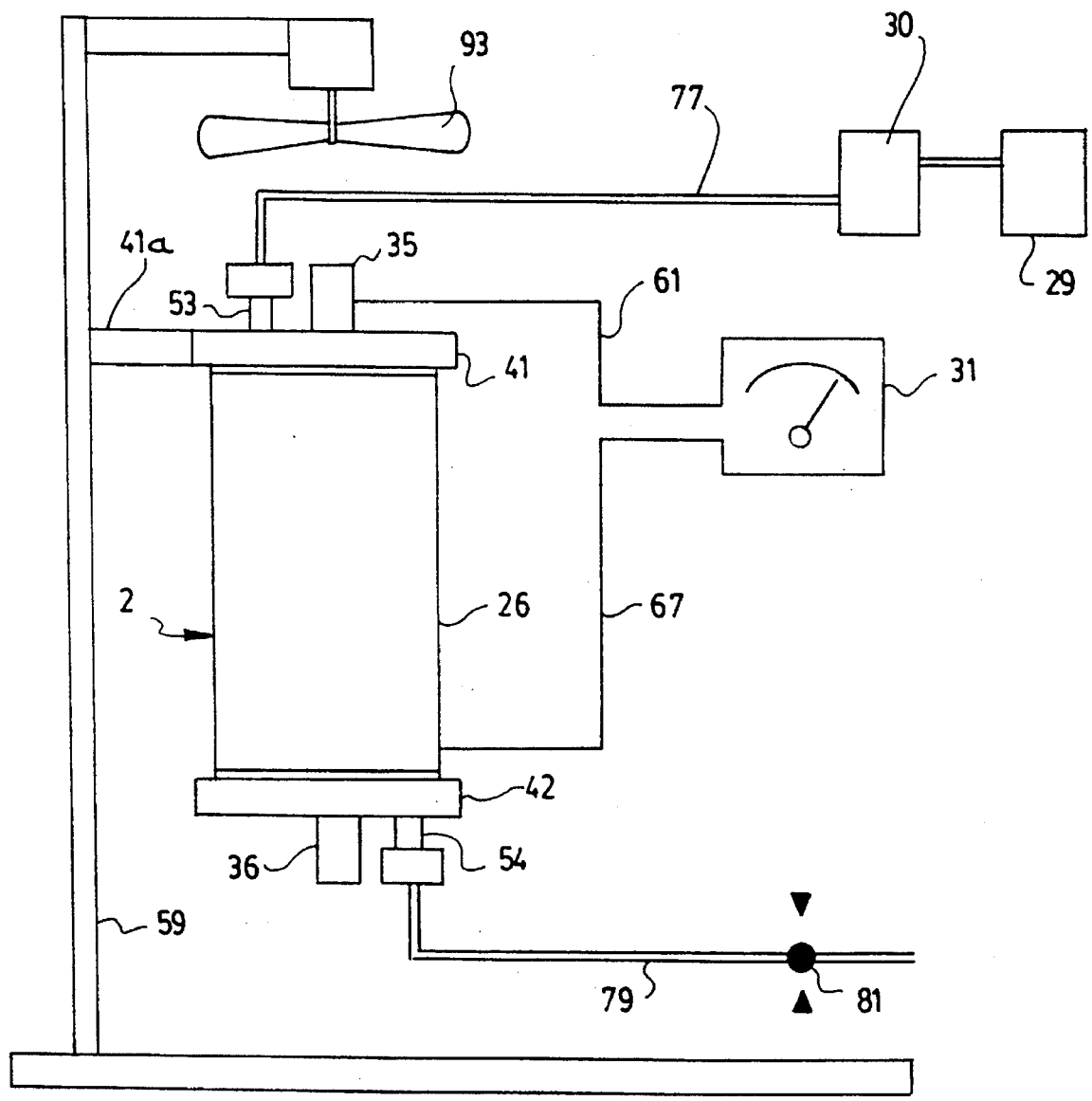
FIG. 7 is a schematic view of an experimental ozone generator comprising a reactor cell as shown in FIG. 4 and using a chimney effect to circulate cooling air in the inner duct.

The cover 41 may be further provided with an arm 41a intended to be connected, especially by welding or by any other appropriated means, on a base 59, for example as shown in FIG. 7, in order to keep the reactor cell 2 in a substantially vertical position.

The outer electrode 21 has opposite ends which are respectively intended to face the cylindrical surfaces 45 and 46 of covers 41 and 42. One "0" ring, preferably two "0" rings 45a and 46a, each made of rubber material, are respectively positioned between cylindrical surface 45 and 46 and the cylindrical surface 25 of the outer electrode 21 in order to seal the gap 27. This gap 27 between surfaces 5 and 23 may advantageously vary from 3 to 5 mm.

As means for circulating a flow of oxygen containing gas through the gap 27, sleeves 53,54 communicate with said gap 27. The sleeve 53 may be connected, as illustrated in FIGS. 7 to 12, to one end of a tubing 77 having opposite ends, the other end of said tubing 77 being connected to the outlet of a supply 29 of pressurized air or oxygen containing gas or, optionally, to the output of a blower or a compressor. The sleeve 54 may be connected to one end of a tubing 79 having opposite ends, the other end of said tubing 79 being optionally connected to a valve, or to a vacuum pump or to the inlet of a device where an oxidation reaction has to be carried out. Optionally, the tubing 77 may be provided with means for creating a pulsed flow of oxygen containing gas (such as air).

Figure 5:
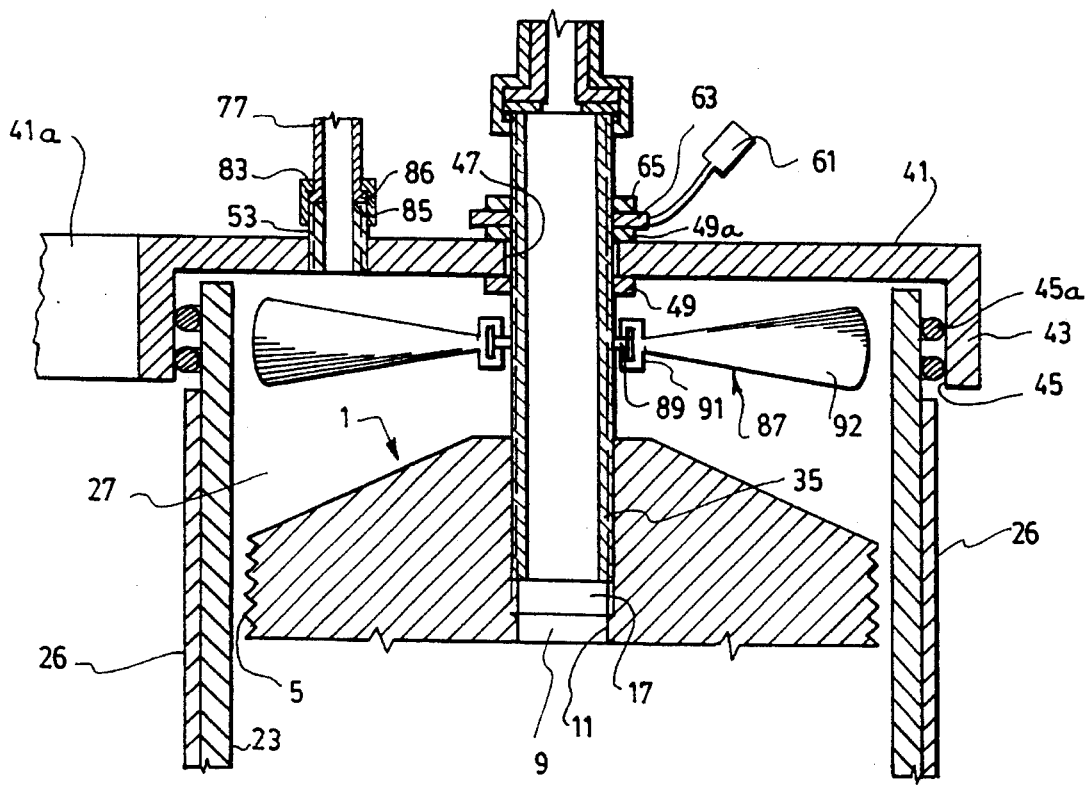
FIG. 5 is a longitudinal cross section view of an upper part of a variant of the reactor cell shown in FIG. 4.

Preferably, as illustrated in FIG. 5, the tubing 77 may be connected to the sleeve 53 with a threaded ring 83 conventionally engaging the threaded surface of the sleeve 53 and pressing a fitting portion 85 against the free end of the sleeve 53. Preferably, a rubber "0" ring 86 may be provided between the fitting 85 and the free end of the sleeve 53. The connection of the tubing 79 on the sleeve 36 is preferably identical to the one illustrated for the tubing 77 with the sleeve 35.

Optionally, as illustrated in the variant of FIG. 5, an air distributor 87 may be mounted on the sleeve 35. This air distributor 87 may consist of a base element 89 provided with a threaded bore engaging the threaded surface of the sleeve 35, and a member 91 pivotally mounted on the base 89 and provided with a plurality of blades 92 radially extending from said member 91 so as to be driven by a pressurized flow of the oxygen containing gas (such as air) entering the gap 27 via the sleeve 53 and thus distributing said air or gas downwardly across the gap 27. This distributor 87 may be mounted on an axial ball bearing so as to rotate when the gas is introduced and further contribute to mix and distribute the gas in the gap 27.

Then, the gas is subjected to electric arcs, and become enriched in ozone before to be evacuated from the reactor cell 2 through the sleeve 54.

As means for applying a potential difference between inner and outer electrodes, with reference to FIG. 4, said electrodes 1 and 21 may be connected by any appropriated means to an electrical power supply. More particularly, the electrode 1 is connected to one pole of a power supply 31 by an electric wire 61 having opposite ends, one end being provided with a connector 63 that is fastened on the sleeve 35 with a nut 65, while the opposite end of said wire 61 is conventionally connected to the electric power supply. The connector 63 is preferably pinched between the nuts 65 and 49a. The electrode 21 is connected to another pole of the power supply 31 by an electric wire 67 having opposite ends, one end of said wire 67 being provided with a connector 69 that is fastened on the foil 26 with a nut-bolt assembly 71 (said assembly being made of non electric conducting material such as TEFLON (trademark)) mounted through a bore 73 provided in the electrode 21, the connector 69 being pinched between the foil 26 and the nut of the assembly 71. Optionally, the wire may be soldered directly on the foil 26.

As means for cooling the outer electrode 21, there is provided, as illustrated in FIGS. 4 to 12, only convection of the surrounding air. Advantageously, the outer surface of the outer electrode may be further provided, as it is well known in the art, with fins, projections or ondulations to increase the surface in contact with the surrounding air. Of course, a flow of air may be forced against the outer electrode by any appropriate means such as a fan. However, it as been found that mere convection was sufficient to allow an appropriate cooling of the outer electrode 21.

As means for circulating a flow of cooling gas through the inner duct 9, preferably the vertical orientation of the inner duct 9 may create a chimney effect by which cool air surrounding the bottom of the reactor 2 is drawn through said inner duct 9, and then contacted against the inner wall 11 of the inner electrode to collect heat (i.e. to become heated) gathered in the mass of the inner electrode 1 before being evacuated via the opening located at the top of the inner electrode 1. Thus referring to FIG. 4, cooling of the inner electrode 1 is advantageously carried out with the surrounding air as cooling gas. At this end, the inner duct 9 of the inner electrode is of the type provided with opposite opened ends and is positioned substantially vertical so as a chimney effect can draw said surrounding air from its bottom opening towards its top opening, said air contacting the inner surface of the inner electrode 1 and collecting heat from the electrode (i.e. being heated) during its passage through said inner duct 9. Advantageously, as illustrated in FIG. 7, a fan may be positioned above the reactor cell 2 in order to draw a flow of air upwardly and thus facilitate the creation of a chimney effect in the inner duct 9 and the movement of air around the outer electrode. Alternatively, the fan could be positioned underneath the reactor cell 2. In that case, the sleeve 36 could be provided with a conical collector 36a (see FIG. 4a) in order to force air through the inner duct 9 and thus further improve the cooling of the inner electrode.

Figure 8:
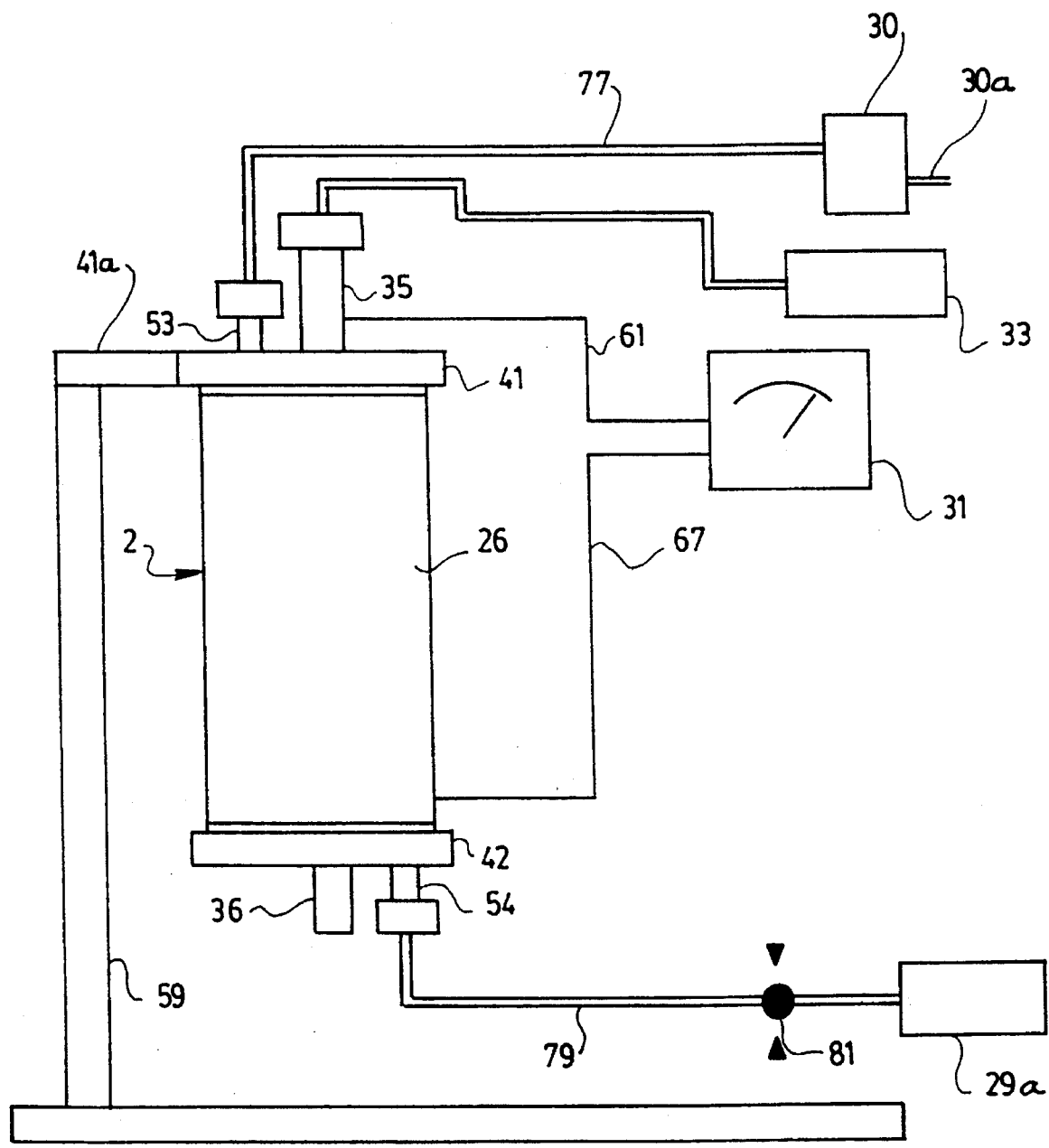
FIG. 8 is a schematic view of an experimental ozone generator comprising a reactor cell as shown in FIG. 4 and a vacuum pump to circulate cooling air in the inner duct.

Optionally, as illustrated in FIG. 8, the sleeve 35 may be connected to one end of a tubing 34 having opposite ends, the opposite end being connected to the inlet of a vacuum pump 33.

Figure 9:
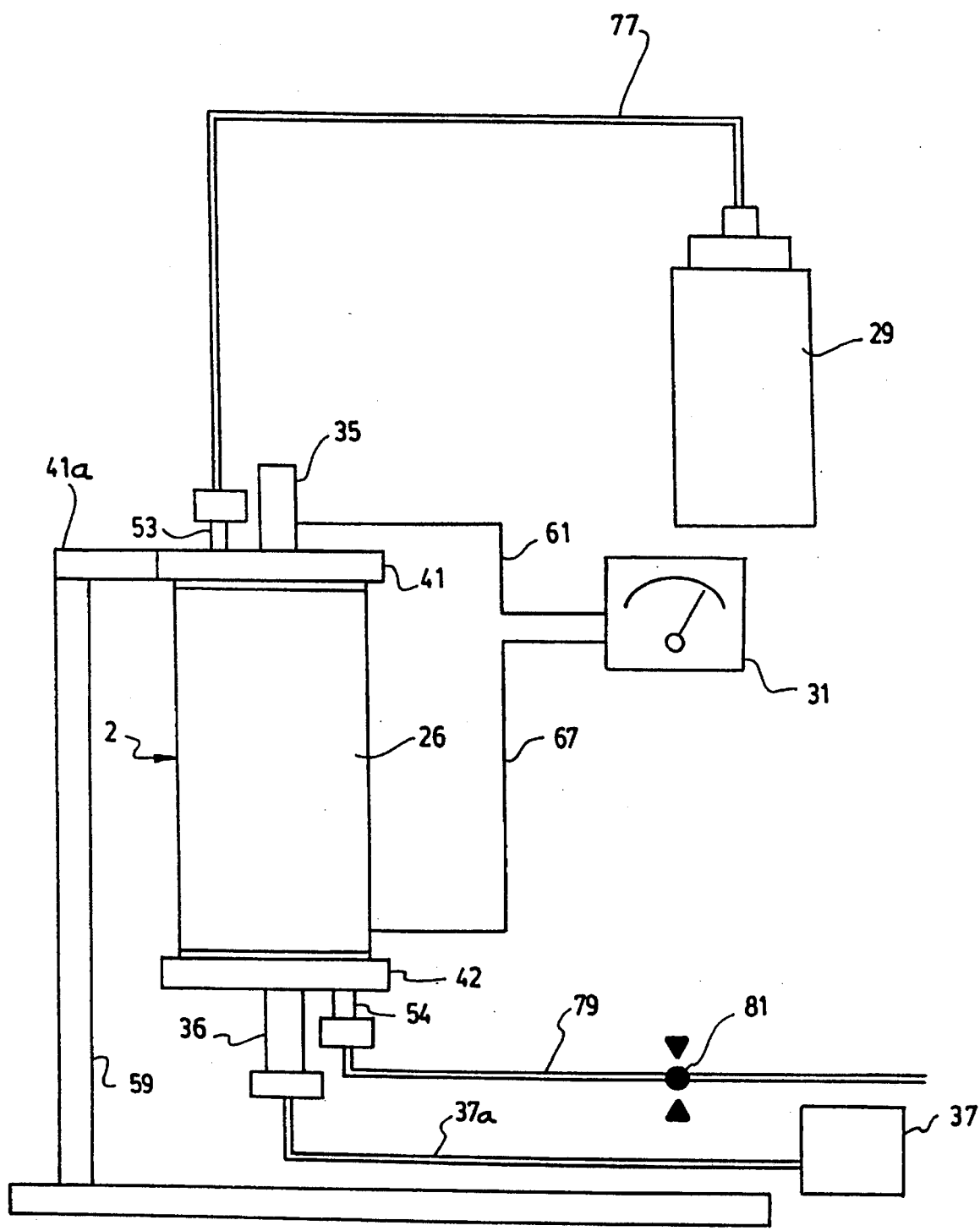
FIG. 9 is a schematic view of an experimental ozone generator comprising a reactor as shown in FIG. 4 and a compressor to circulate cooling air in the inner duct.
Figure 10:
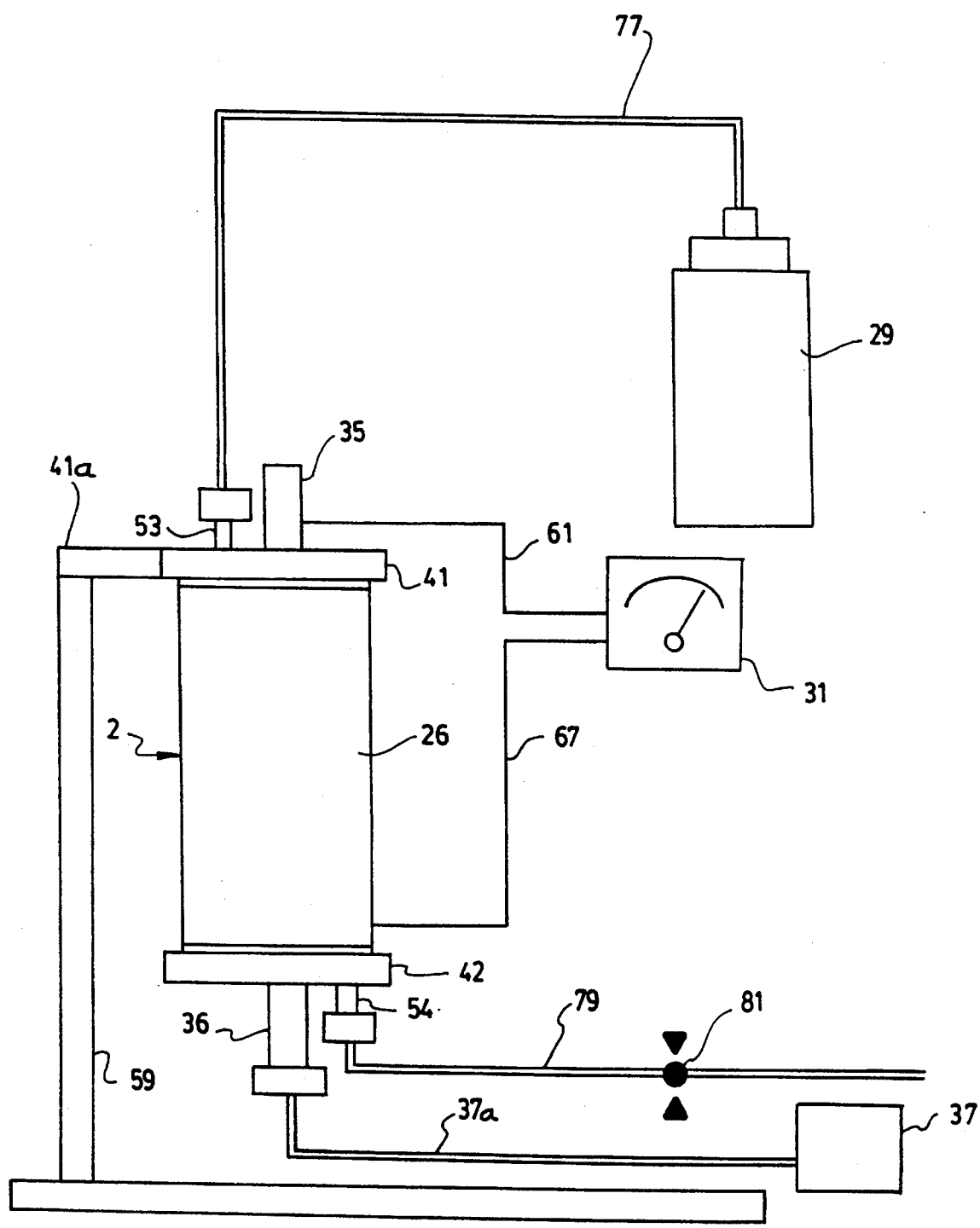
FIG. 10 is a schematic view of an experimental ozone generator comprising a reactor cell as shown in FIG. 6 and a compressor to circulate cooling air in the inner duct.

Optionally, as illustrated in FIG. 9, means may be provided to force a pressurized flow of air through said duct 9 in order to allow said air to contact the inner surface 11 of the inner electrode and become heated during its passage through said inner duct. Preferably, said means may consist of a fan, a blower, a compressor, a bottle of compressed air or gas, etc. Preferably, a compressor 37 is connected to the sleeve 36 with a tubing 38 having opposite ends. One end of the tubing 38 may be connected to the sleeve 36 in the same way than the tubing 34 is connected to the sleeve 35 in FIG. 5 and 8. According to variant of the invention, as illustrated in FIG. 6 and 10, one opening of the inner duct 9, preferably the outlet of the sleeve 36, may be provided with means allowing a sudden expansion of the gas inside the inner duct so as to provide a sudden lowering of the temperature of the gas to thus allow a more efficient cooling of the inner electrode 1. Such a lowering of the temperature by sudden expansion of the gas is well known as a Joule-Thompson effect. The pressurized cooling gas entering the inner duct in order to be expanded in said duct may originate from an air compressor or a pressurized bottle of air or gas. This sudden expansion may be obtained with a sleeve 36 having its end located inside the inner duct 9 and provided with a small opening 36a. The cross section of this opening 36a is much smaller than the cross section of the inner duct 9. The initial pressure of the cooling gas may be of about 1000 psi. The cooling gas may be advantageously selected amongst air, ammonia, carbon dioxide, nitrogen, etc.

Referring to FIG. 7 there is represented a schematic view of an ozone generator comprising a reactor cell 2 as defined in FIG. 4, an air compressor 29, a vessel 30 comprising desiccant material, a fan 93 and a power supply 31. The reactor cell 2 is mounted on a base 59 by any appropriated means in order to orient the inner duct 9 substantially vertically. Preferably, the reactor cell 2 is provided with a cover having an arm 41a that is welded on the base 59.

In order to use an ozone generator as described in FIGS. 4 and 7, the fan 93 is started so as a flow of cool air located at the vicinity of the sleeve 36 is drawn upwardly and circulated through the inner duct 9 by a chimney effect and by the fan 93 to thus contact the inner surface 11 and collect heat gathered in the mass of the inner electrode 1 before to be evacuated through the sleeve 35; a potential difference (for example 25 KV) is applied between electrodes 1 and 21; (at this end electric wires 61, 67 may be used) and a flow of air or oxygen containing gas is circulated from the air compressor 29 through the desiccant material contained in the vessel 30, the tubing 77, the sleeve 53 located at the top of the reactor 2, in the gap 27, through the sleeve 54 located at the bottom of the reactor 2 and through the tubing 79 and the valve 81 before being either released in the atmosphere or introduced in a medium to be oxidized (i.e. water, especially waste water). The outer electrode 21 may be cooled by any appropriated means well known in the art such as convection of the surrounding atmosphere. Preferably, an ascending draft generated by the fan 93 will cool it.

Referring to FIG. 8 there is represented a schematic view of an ozone generator comprising a reactor cell 2 as defined in FIG. 4, a vessel 30 containing an air desiccant, a vacuum pump 29a, a vacuum pump 33 and a power supply 31. The reactor cell 2 is mounted on a base 59 by any appropriated means in order to orient the inner duct 9 vertically. Preferably, the reactor cell 2 is provided with a cover having an arm 41a that is welded on the base 59.

In order to use an ozone generator as described in FIGS. 4 and 8, the vacuum pump 33 is started so as a flow of cool air located at the vicinity of the sleeve 36 is drawn and circulated through the inner duct 9 to thus contact the inner surface 11 and collect heat gathered in the mass of the inner electrode 1 before to be evacuated through the vacuum pump 33; a potential difference (for example 25 KV) is applied between electrodes 1 and 21 (at this end, electric wires 61,67 may be used); and the vacuum pump 29a is started to circulate a flow of air or oxygen containing gas from the opening 30a through the desiccant material contained vessel 30, the tubing 77, the sleeve 53 located at the top of the reactor 2, in the gap 27, through the sleeve 54 located at the bottom of the reactor 2 and through the tubing 79, the valve 81 and the vacuum pump 29a before being released in the atmosphere or in a medium to be oxidized (i.e. water, especially waste water). The outer electrode 21 may be cooled by any appropriated means well known in the art such as convection of the surrounding atmosphere. Optionally, a fan can blow cool air against it.

Referring to FIG. 9 there is represented a schematic view of an ozone generator comprising a reactor cell 2 as defined in FIG. 4, a bottle 29 of compressed air (which may be easily replaced by a compressor equipped with a dryer), a compressor 37 and a power supply 31. The reactor cell 2 is mounted on a base 59 by any appropriated means in order to orient the inner duct 9 vertically. Preferably, the reactor cell 2 is provided with a cover having an arm 41a that is welded on the base 59.

In order to use an ozone generator as described in FIGS. 4 and 9, the compressor 37 is started so as a pressurized flow of cool air is introduced in the piping 37a and in the sleeve 36 and is circulated through the inner duct 9 to thus contact the inner surface 11 and collect heat gathered in the mass of the inner electrode 1 before to be evacuated through the sleeve 35; a potential difference (for example 25 KV) is applied between electrodes 1 and 21; (at this end electric wires 61, 67 may be used); and a flow of air or oxygen containing gas is circulated from the bottle 29 through the tubing 77, the sleeve 53 located at the top of the reactor 2, in the gap 27, through the sleeve 54 located at the bottom of the reactor 2 and through the tubing 79 and the valve 81 before being either released in the atmosphere or introduced in a medium to be oxidized (i.e. water, especially waste water). The outer electrode 21 may be cooled by any appropriated means well known in the art such as convection of the surrounding atmosphere. Optionally, a fan can blow cool air against it.

Referring to FIG. 10 there is represented a schematic view of an ozone generator comprising a reactor cell 2 as defined in FIG. 6, a bottle 29 of compressed air (which may be easily replaced by a compressor equipped with a dryer), a compressor 37 and a power supply 31. The reactor cell 2 is mounted on a base 59 by any appropriated means in order to orient the inner duct 9 vertically. Preferably, the reactor cell 2 is provided with a cover having an arm 41a that is welded on the base 59.

In order to use an ozone generator as described in FIGS. 4 and 10, the compressor 37 is started so as a pressurized flow of cool air is introduced in the tubing 37a and in the sleeve 36 and is circulated through the opening 36a and expanded in inner duct 9 to thus lowering its temperature before coming into contact with the inner surface 11 and collect heat gathered in the mass of the inner electrode 1 before to be evacuated through the sleeve 35; a potential difference (for example 25 KV) is applied between electrodes 1 and 21; (at this end electric wires 61, 67 may be used) and a flow of air or oxygen containing gas is circulated from the bottle 29 through the tubing 77, the sleeve 53 located at the top of the reactor 2, in the gap 27, through the sleeve 54 located at the bottom of the reactor 2 and through the tubing 79 and the valve 81 before being either released in the atmosphere or introduced in a medium to be oxidized (i.e. water, especially waste water). The outer electrode 21 may be cooled by any appropriated means well known in the art such as convection of the surrounding atmosphere. Optionally, a fan can blow cool air against it.

Figure 11:
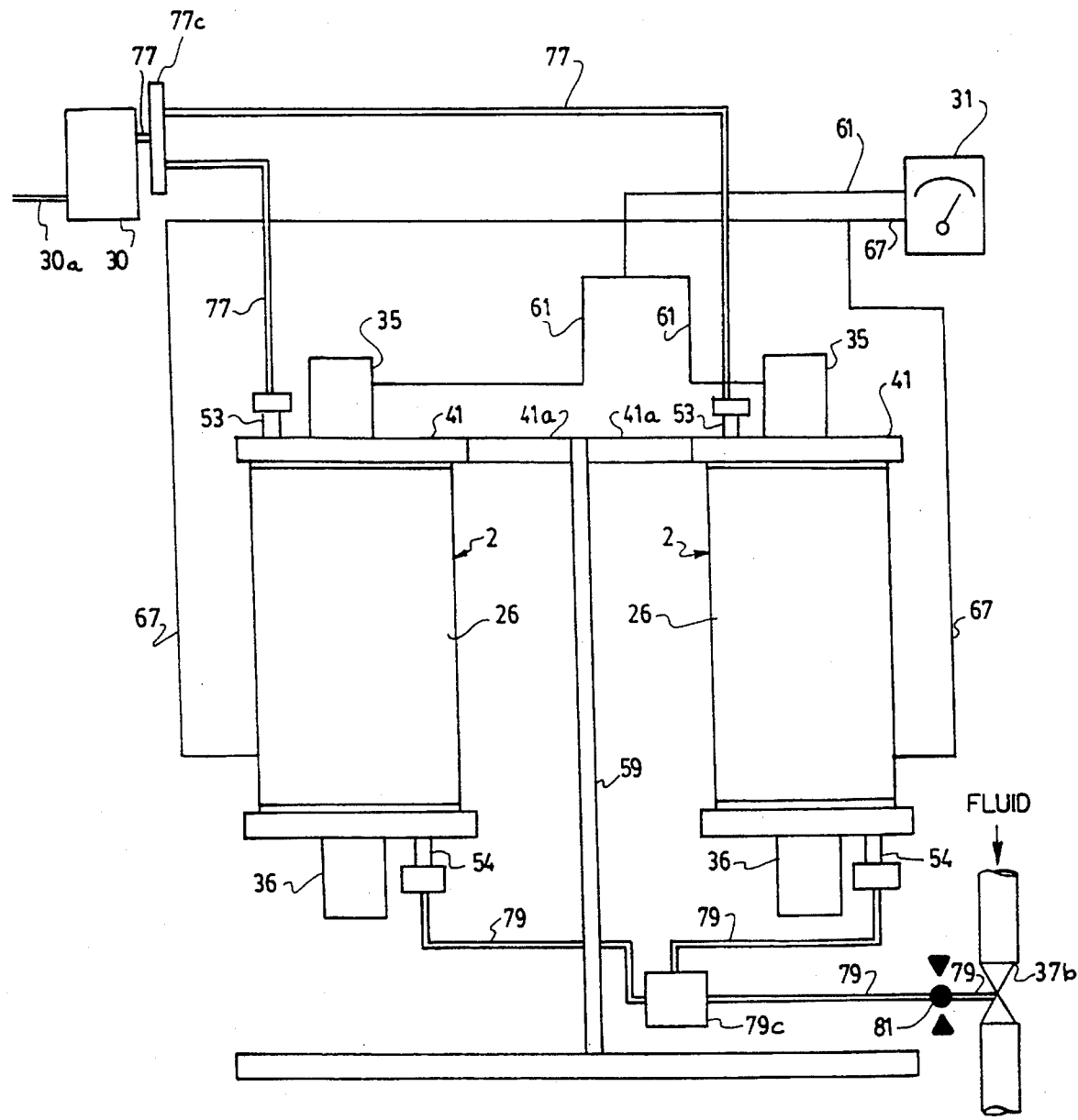
FIG. 11 is a schematic view of an experimental ozone generator comprising reactor cells of FIG. 4 and a venturi device.

Referring to FIG. 11, there is represented a schematic view of an ozone generator comprising generator cells 2 as defined in FIG. 4, a vessel 30 containing an air desiccant, a power supply 31. Reactor cells are mounted on a base 59 by any appropriated means in order to preferably orient each inner duct substantially vertically, each reactor cell 2 being provided with a cover 41 having an arm 41a that may be welded on the base 59. Means for circulating an oxygen containing gas in each reactor cell 2 consist of a venturi device 37b through which a fluid, preferably a fluid to be treated with ozone, is circulating in order to create a vacuum effect.

In order to use an ozone generator as described in FIGS. 4 and 11, a flow of pressurized fluid (e.g. water) is circulated through the venturi device 37b to create a vacuum in the tubing 79. Then a potential difference (for example 25 KV) is applied between electrodes 1 and 21 of each reactor cell (at this end, electric wires 61, 67 may be used). Then the valve 81 is opened and a flow of air is allowed to circulate through the opening 30a, the vessel 30 of desiccant, tubings 77, (including a manifold 77c) sleeves 53, gaps 27, sleeves 54, tubings 79 (including a manifold 79c) and the venturi device 37b where the ozone enriched air is admixed with the fluid (e.g. water). A flow of air is drawn through the inner ducts 9 by chimney effect to cool the inner electrode, the surrounding air contact the outer electrode by mere convection to cool it.

EXAMPLES

Figure 12:
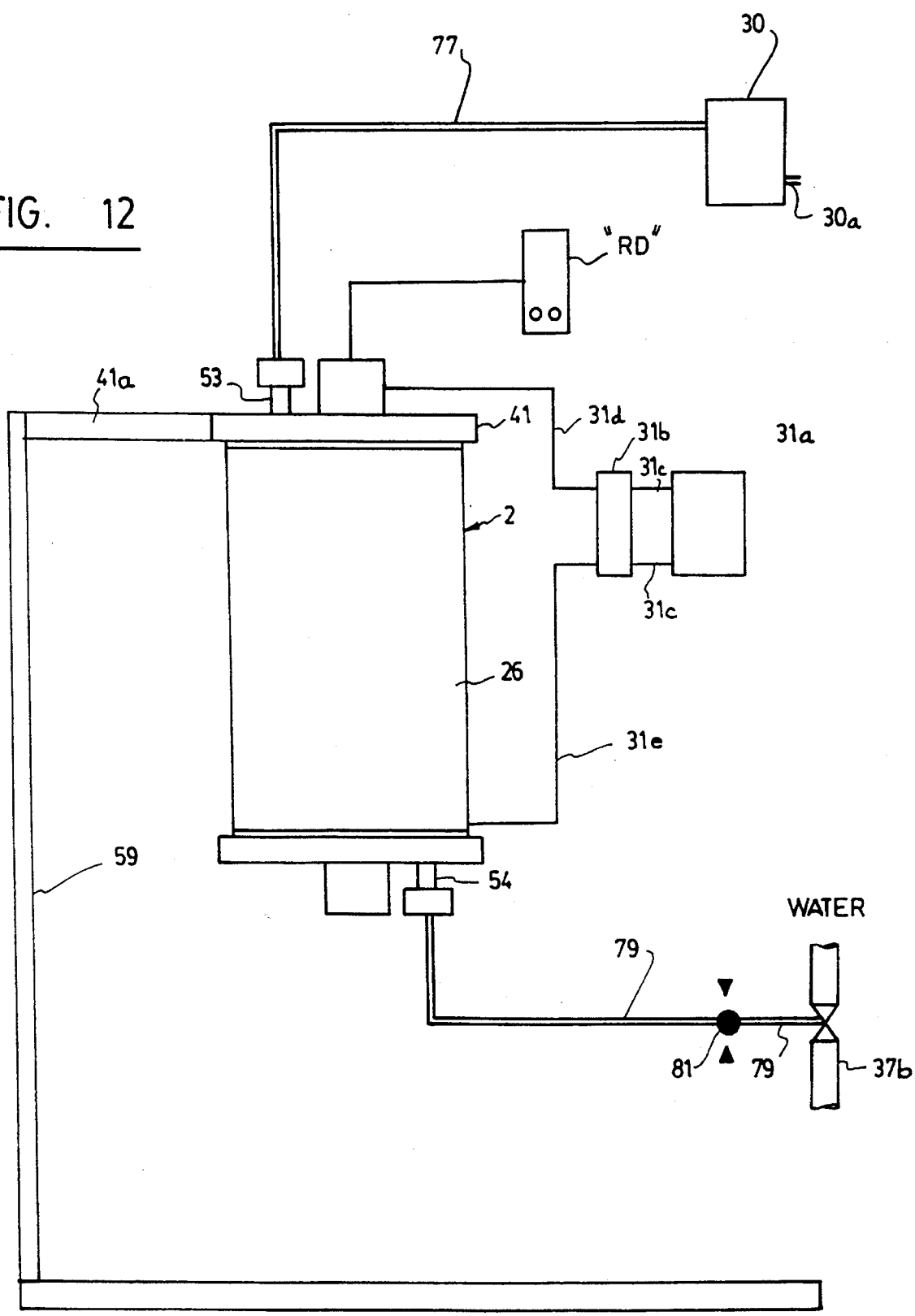
FIG. 12 is a schematic view of an experimental ozone generator used to carry out examples 1 to 4.
Figure 13:
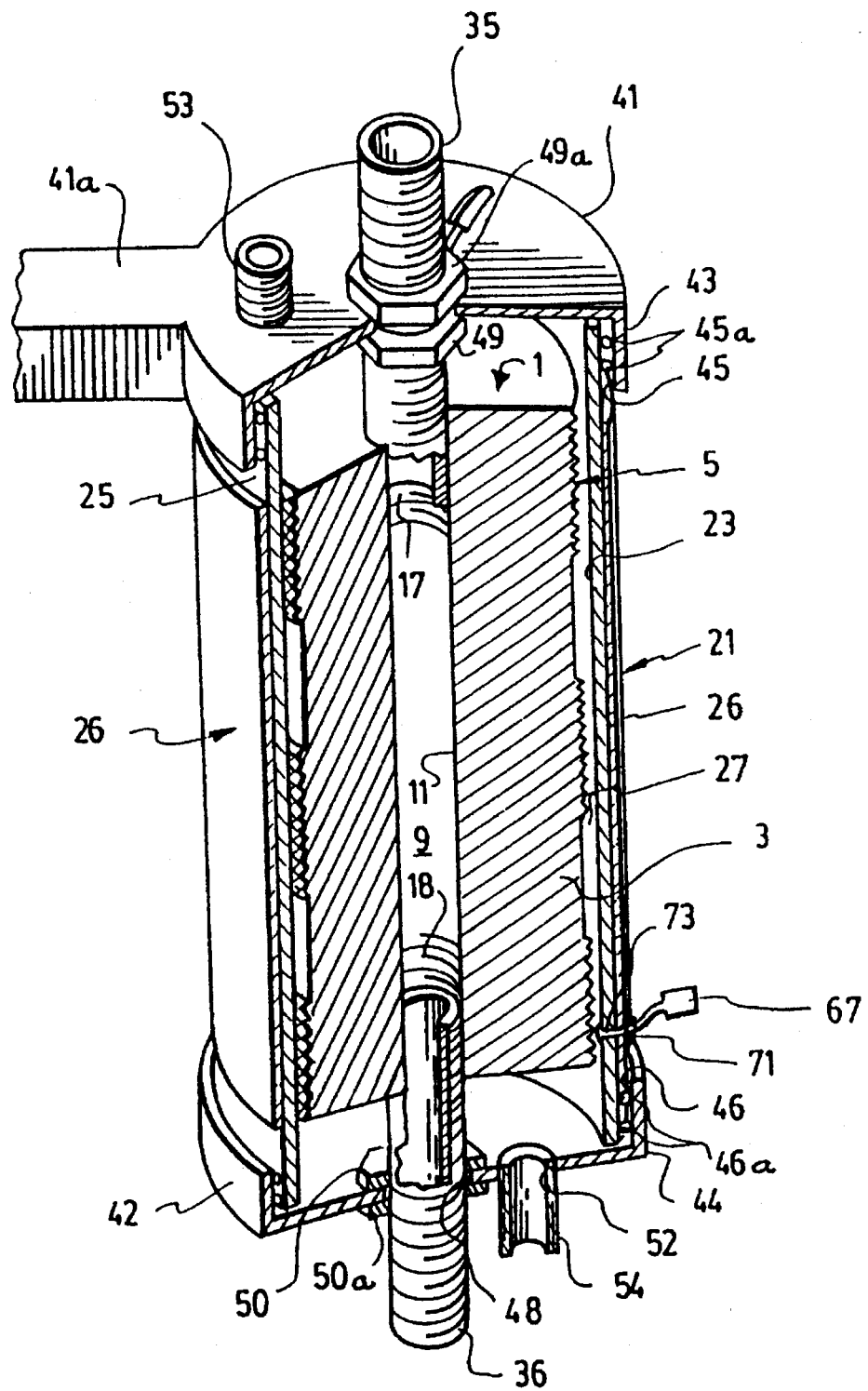

Referring to FIG. 12, there is represented a schematic view of an ozone generator used to carry out the following examples 1 to 4. This ozone generator comprises a reactor cell 2 as defined in FIG. 13, an air vessel 30 containing desiccant material, a venturi device 37b, a transformer 31a and a frequencer 31b. The reactor cell illustrated in FIG. 13 is identical to the one of FIG. 4 except the inner electrode is of the type of the one illustrated in FIG. 3a. The reactor cell 2 is mounted on a base 59 by any appropriated means in order to orient the inner duct 9 vertically. Preferably, the reactor cell 2 is provided with a cover having an arm 41a that is welded on the base 59. Furthermore, a sensor of a thermocouple is positioned inside the inner duct 9 and is connected to a reading device "RD". The transformer 31*a* is connected to the frequencer 31*b* with wires 31*c* and the frequencer 31*b* is connected to the electrodes 1 and 21 with wires 31*d*, 31*e*.

In order to use an ozone generator as described in FIGS. 4 and 12, with an electrode as in FIG. 3*b*, water is circulated in the venturi device 37*b* to create a vacuum in the tubing 79, then the valve 81 is opened and a flow of air is allowed to circulate through the opening 30*a*, the desiccant material contained in the vessel 30, the tubing 77, the sleeve 53, the gap 27, the sleeve 54, the tubing 79 and the valve 81, and the venturi device 37*b* where the ozone enriched air is then admixed with water. At the outlet of the venturi, aliquote samples of water enriched with ozone are collected in a "HASH" test tube in order to carry out an analysis of the "ozone" content of the water. This analysis method is well known to skilled workman and do not need to be further detailed. Of course, a difference of potential (25 KV) is applied between electrodes 1 and 21 and electrodes 1 and 21 are respectively cooled by surrounding air drawn on the duct 9 by a chimney effect, and the surrounding air by mere convection.

The inner electrode 1 which is of the type illustrated in FIG. 13 is made of aluminium with three zones 8 of protrusions 7 spaced apart from each other by smooth zones 8*a*. Protusions are formed by sets of grooves 13, 15, similar to those of FIG. 2, spaced apart at 1 mm from each other. The inner electrode 1 has an overall length of 6 inches with 3 zones 8 of 1 inch spaced apart by smooth zones 8*a* of 1½ inch. The diameter of the outer surface 5 of the electrode 1 is of about 1,125 inch. The dielectric material of the outer electrode 21 is a glass tube having an inner diameter of 30 mm and an outer diameter of 34 mm. The foil 29 consist of a foil of brass fastened to the outer surface of the tube of glass. This foil completely surround a height of 6 inches of the outer surface of the glass tube.

Covers 41, 42 are each provided with an inner cylindrical surface of about 38 mm. Of course, "O" ring 45*a*, 46*a* are provided between the outer surface of the glass tube and the inner cylindrical surface of the covers 41,42.

The following examples 1 to 4 were carried out under the following conditions:

| i | transformer: | primary voltage 110 V, 60 cycles, secondary voltage 10 KV to 25 KV; |
| --- | --- | --- |
| ii | venturi: | 6 liters/min, water flow rate suction of 7 cfh of air; |
| iii | relative humidity of air: less than 5% | |
| iv | cooling: | natural convection. |
| v | ambiant temperature: 20° C. | |

| ozone production (mg/min) | examples | wattage | temp. of inner electrode | primary voltage | secondary voltage frequency |
| --- | --- | --- | --- | --- | --- |
| 0.96 | 1 | 20 | 25° C. | 110 V | 60 |
| 2.25 | 2 | 35 | 25° C. | 110 V | 60 |
| 3.30 | 3 | 60 | 25° C. | 110 V | 60 |
| 10.80 | 4 | 128 | 25° C. | 110 V | 220 |

The ozone production was determined by measuring the ozone concentration in water with the well known HACH test.

It should be noted that when other electrode configuration were used, such as open brush system of the prior art, much less $O_3$ was detected with the well known HACH test in water.

These tests demonstrates that according to the invention making the object of the present patent application, the K constant which is calculated from the equation $$C = K.W$$

is situated between the following values

| EXAMPLE 1 | $K_1 = 0,048$ |
| --- | --- |
| EXAMPLE 2 | $K_2 = 0,064$ |
| EXAMPLE 3 | $K_3 = 0,055$ |
| EXAMPLE 4 | $K_4 = 0,084$ |

The aforesaid tests were repeated with prior art ozone generators. More particularly, an ozone generator of the type sold by a company called OZONE PURE WATER, Florida, USA, and an ozone generator of the type sold by a company called DUNDER ELECTRONIC, Ottawa, CANADA, were used.

The ozone generator of OZONE PURE WATER was of the type comprising two reactor cells each consisting of a tube of stainless steel in which a brush of stainless steel is positioned. The brush electrode has an overall length of 5 inches in a container of 7 inches height by 2½ inches diameter. A dielectric is positioned between said electrodes.

The ozone generator of DUNDER ELECTRONIC consist of one reactor cell where electrodes are each made of stainless steel and coated with a ceramic material as dielectric.

Electrodes of reactor cells of all aforesaid prior generator were submitted to the same operative conditions than the ozone generator making the object of the invention.

Those tests showed:

| K open brush | $K_{brush} = 0,0087$ and $0,0068$ |
| --- | --- |
| K plate system | $K_{plate}$ (3 inches × 4 inches) = $0,017$ |

Of course, all aforesaid connection between tubings 77 or 79 and sleeves 35, 36, 53, 54 may be preferably made with connectors similar to those illustrated in FIG. 5.

Also, the above described invention also relates to all variations that may be obvious to a skilled workman.

What is claimed is:

1. An electrode for an ozone generator, having an outer surface and an inner surface, comprising:

a member of heat and electric conducting material whose at least a portion of the outer surface is provided a plurality of protrusions defining a plurality of points;

at least one inner duct having opposite opened ends, provided in the member and defining the inner surface to the electrode, the inner duct being intended to allow a flow of cooling gas to circulate therethrough and contact the inner surface of the electrode;

wherein the electrode is a cylinder having a density varying from 0.5 to 0.9 and with the outer surface is being that the electrode works as a heat sink to collect heat generated at the outer surface and bring heat at the outer surface of the electrode at a heat flow to the inner surface of the electrode where the heat is collected by the cooling gas.

2. An electrode according to claim 1, wherein protrusions of the outer surface of the inner electrode are obtained either by chemical etching of said surface or by machining of said surface to provide at least two sets of grooves having a low depth, each groove of one set crossing at least one groove of another set.

3. An electrode according to claim 2, wherein protrusions are divided on the outer surface of the inner electrode, in groups of different sizes and shapes.

4. An electrode according to claim 2, wherein the inner electrode is a massive cylinder of heat and electric conductive material, said material being selected from the group consisting of graphite, steel, stainless steel, brass, copper, tungsten, molybdenum, aluminum and alloys thereof, and having an apparent density of 0.5 to 0.9 of the material used.

5. An electrode according to claim 4, wherein the outer surface of the inner electrode and its protrusions are further coated with a metal or alloy thereof that will be not affected by ozone or a corona effect.

6. An electrode according to claim 5, wherein the outer surface of the inner electrode and its protrusions are further coated with a metal selected from the group consisting of gold, platinum and palladium.

7. An electrode according to claim 6, wherein the outer surface of the inner electrode is provided with from 9 to 1,000 points/cm$^2$.

8. An electrode according to claim 7, wherein the depth of each groove varies from 0.01 to 3 mm.

9. An electrode according to claim 8, wherein the ratio between the outer and inner surfaces varies from 2 to 5.

10. An electrode according to claim 9, wherein the cooling gas that is intended to be used is the surrounding air and wherein the inner duct of the inner electrode is intended to be substantially vertical so as a chimney effect can draw said surrounding air from its bottom opening toward its top opening, said air contacting the inner surface of the inner electrode in order to be heated during its passage through said inner duct.

11. An electrode according to claim 10, wherein the chimney effect is further associated with means allowing to draw the surrounding air from the bottom opening of the inner duct to the top opening of the inner duct.

12. An electrode according to claim 11, wherein said means allowing to draw the surrounding air from the bottom opening of the inner duct to the top opening of the inner duct are either a fan positioned above the top or bottom opening of the inner duct or a vacuum pump having an inlet connected to the top opening of the inner duct.

13. An electrode according to claim 9, wherein said inner duct has one of its ends intended to be further connected with means allowing to force a pressurized flow of air therethrough.

14. An electrode according to claim 13, wherein said means consist of a fan, a blower, a compressor or a bottle of compressed air or gas.

15. An electrode according to claim 14, wherein one opening of the inner duct is provided with means intended to allow a sudden expansion of a flow of pressurized cooling gas inside the inner duct so as to provide a sudden lowering of the temperature of said gas according to a Joule-Thompson effect contributing to increase the differential of temperature between the expanded cooling air and the inner surface of the inner electrode to thus further improve the efficiency of the heat transfer.

16. An electrode according to claim 15 wherein the pressurized cooling gas is a pressurized air generated by an air compressor.

17. An ozone generator, comprising:
an outer electrode made of dielectric material, having an inner surface and having an outer surface comprising an electric conducting material;
an inner electrode having an outer surface, said inner electrode being concentrically positioned inside the outer electrode;
a gap positioned between said inner and outer surfaces;
means for circulating an oxygen containing gas through said gap;
means for applying a potential difference between said inner and outer surfaces;
means for cooling the inner electrode;
means for cooling the outer electrode; and
wherein said inner electrode comprises:
a member of heat and electric conducting material whose at least a portion of the outer surface comprises is provided with a plurality of protrusions defining a plurality of points;
at least one inner duct having opposite ends, provided in the member and defining an inner surface to said inner electrode, said inner duct being intended to allow a flow of cooling gas to circulate therethrough and contact said inner surface; and
means for circulating said cooling gas through said inner duct; and
wherein said inner electrode is a cylinder having a density varying from 0.5 to 0.9 and with the outer surface of the inner electrode is being that the inner electrode works as a heat sink to collect heat generated at the outer surface of the inner electrode and bring the heat at the outer surface of the inner electrode at a heat flow to the inner surface of the inner electrode where the heat is collected by the cooling gas.

18. An ozone generator according to claim 17, wherein protrusions of the outer surface of the inner electrode are obtained either by chemical etching, electroforming or by machining of said surface to provide at least two sets of grooves having a low depth, each groove of one set crossing at least one groove of another set.

19. An ozone generator according to claim 18, wherein protrusions are divided on the outer surface of the inner electrode, in groups of different sizes and shapes.

20. An ozone generator according to claim 18, wherein the inner electrode is a massive cylinder of heat and electric conductive material, said material being selected from the group consisting of graphite, steel, stainless steel, brass, copper, tungsten, molybdenum, aluminum and alloys thereof, and having an apparent density of 0.5 to 0.9 of the material used.

21. An ozone generator according to claim 20, wherein the outer surface of the inner electrode and its protrusions are further coated with a metal or alloy thereof that will be not affected by ozone or a corona effect.

22. An ozone generator according to claim 21, wherein the outer surface of the inner electrode and its protrusions are further coated with a metal selected from the group consisting of gold, platinum and palladium.

23. An ozone generator according to claim 22, wherein the outer surface of the inner electrode is provided with from 9 to 1000 points/cm$^2$.

24. An ozone generator according to claim 23, wherein the depth of each groove varies from 0.01 to 3 mm.

25. An ozone generator according to claim 24, wherein the ratio between the outer and inner surfaces varies from 2 to 5.

26. An ozone generator according to claim 25, wherein the cooling gas is the surrounding air and wherein inner duct of the inner electrode is substantially vertical so as a chimney effect can draw said surrounding air from its bottom opening toward its top opening, said air contacting the inner surface of the inner electrode in order to be heated during its passage through said inner duct.

27. An ozone generator according to claim 26, wherein means are further provided to draw, in association with the chimney effect, the surrounding air from the bottom opening of the inner duct to the top opening of the inner duct.

28. An ozone generator according to claim 27, wherein means allowing to draw, in association with the chimney effect, the surrounding air from the bottom opening of the inner duct to the top opening of the inner duct are either a fan positioned above the top opening or bottom or a vacuum pump connected to the top opening.

29. An ozone generator according to claim 25, wherein said inner duct has one of its ends further connected with means intended to force a flow of air therethrough.

30. An ozone generator according to claim 29, wherein said means consist of a fan, a blower, a compressor or a bottle of compressed air or gas.

31. An ozone generator according to claim 29, wherein the inner duct of the inner electrode is provided with means allowing a sudden expansion of a flow of pressurized cooling gas inside the inner duct so as to provide a sudden lowering of the temperature of the gas, according to a Joule-Thompson effect, contributing to increase the differential of temperature between the expanded cooling air and the inner surface of the inner electrode to thus further improve the efficiency of the heat transfer.

32. An ozone generator according to claim 31, wherein the pressurized cooling gas is a pressurized air generated by an air compressor.

33. A method for generating ozone, comprising the steps of:

providing an ozone generator, comprising:
an outer electrode made of dielectric material, having an inner surface and having an outer surface comprising an electric conducting material;
an inner electrode having an outer surface, said inner electrode being concentrically positioned inside the outer electrode;
a gap positioned between said inner and outer surfaces;
means for circulating an oxygen containing gas through said gap;
means for applying a potential difference between said inner and outer surfaces;
means for cooling the inner electrode;
means for cooling the outer electrode; and
wherein said inner electrode comprises:
a member of heat and electric conducting material whose at least a portion of the outer surface comprises is provided with a plurality of protrusions defining a plurality of points;
at least one inner duct having opposite ends, provided in the member and defining an inner surface to said inner electrode, said inner duct being intended to allow a flow of cooling gas to circulate therethrough and contact said inner surface; and
means for circulating said cooling gas through said inner duct; and
said inner electrode being a cylinder having a density varying from 0.5 to 0.9 and with the outer surface of the inner electrode being that the inner electrode works as a heat sink to collect heat generated at the outer surface of the inner electrode and bring the heat at the outer surface of the inner electrode at a heat flow to the inner surface of the inner electrode where the heat is collected by the cooling gas;

circulating a flow of an oxygen containing gas in a gap of a reactor cell of the ozone generator, from an inlet to an outlet of the ozone generator; and applying a potential difference between the inner and outer surfaces of said electrodes so that electric arcs pass from the inner surface of the outer electrode to the protrusions of the outer surface of the inner electrode through the oxygen containing gas to thus generate an oxygen containing gas enriched at the outlet of the reactor cell.

34. A method according to claim 33, wherein the oxygen containing gas is air.

* * * * *